Oct. 28, 1930.  J. M. MOTT  1,779,556

MILK BOTTLE CAP REMOVER

Filed Dec. 15, 1928

INVENTOR.
J. M. Mott,
BY Irving L. McCathran
ATTORNEY

Patented Oct. 28, 1930

1,779,556

UNITED STATES PATENT OFFICE

JOHN M. MOTT, OF MOSCOW, PENNSYLVANIA

MILK-BOTTLE-CAP REMOVER

Application filed December 15, 1928. Serial No. 326,186.

This invention appertains to cap removers and more particularly to a novel device for facilitating the quick removal of the sealing cap of milk bottles.

One of the primary objects of the present invention is to provide a milk bottle cap remover which can be quickly applied to the cap and readily remove the same in a minimum amount of time without undue effort on the part of the operator and without danger of spilling the milk.

Another salient object of the invention is the provision of a milk bottle cap remover constructed from a single strand of wire so folded as to provide a rigid tool which can be used a great number of times without injury thereto or appreciable wear thereon.

Another important object of the invention is the provision of a milk bottle cap remover formed from a single strand of wire embodying a manipulating handle and a heel or fulcrum member with a depending and forwardly projecting penetrating prong arranged below the heel or fulcrum portion, with novel means for forming the wire so as to reinforce the heel and prong portions and the shank thereof so as to prevent movement of these portions relative to one another.

A still further object of the invention is to provide a milk bottle cap remover which will be durable and efficient in use, one that will be simple and easy to manufacture and one which can be placed upon the market at an extremely low cost.

With these and other objects in view, the invention consists in the novel constructions, arrangement and formation of parts as will be hereinafter more specifically described, claimed and illustrated in the accompanying drawings, in which drawings:—

Referring to the drawing in detail, wherein similar reference characters designate corresponding parts throughout the several views, the letter A generally indicates the improved milk bottle cap remover, B a milk bottle and C a milk bottle cap.

Figure 1:
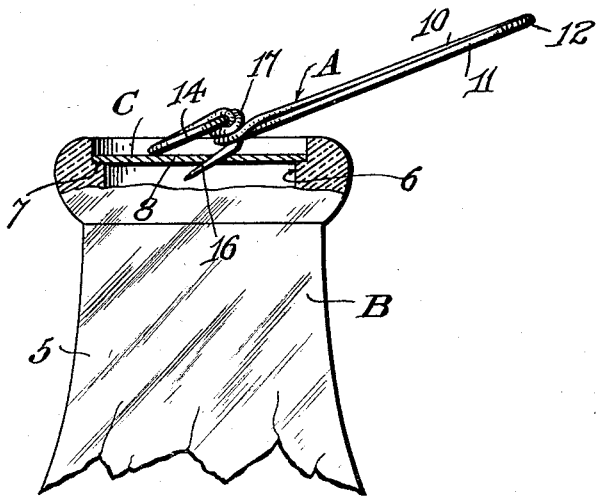
Figure 1 is a side elevaiton of my improved milk bottle cap remover, showing the same in operative position relative to a milk bottle and cap, a fragment of the milk bottle being shown with the neck thereof broken away and in section.
Figure 2:
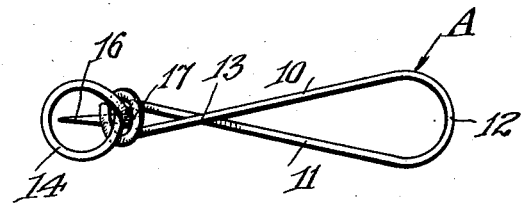
Figure 2 is a top plan view of the milk bottle cap remover.
Figure 3:
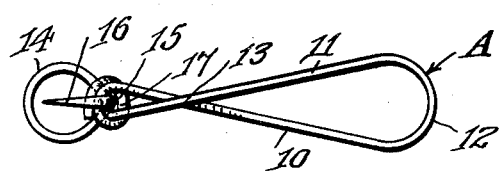
Figure 3 is a bottom plan view of the milk bottle cap remover.
Figure 4:
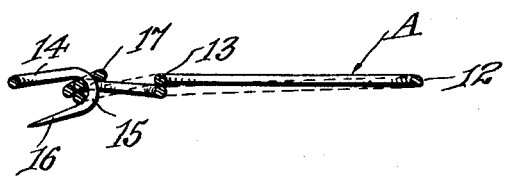
Figure 4 is a longitudinal section through the milk bottle cap remover.

The milk bottle B and the milk bottle cap C forms no part of the present invention, and as shown the milk bottle is of conventional construction embodying the usual neck 5 having the mouth piece 6 provided with the seat 7 for the cap C. The cap C is also of conventional construction and includes the usual pasteboard disc body 8.

The improved milk bottle cap remover A, is formed of a single strand of wire which is folded at a point intermediate its ends to provide a pair of elongated leg members 10 and 11 connected together by an arcuate bight portion 12. These leg members 10 and 11 are arranged at an angle to one another and cross each other as indicated by the reference character 13 so as to form a brace for one another. The leg portions 11 and 10 and the connecting arcuate bight portion 12 form a manipulating handle portion, as can be readily understood by referring to the drawing. The leg member 11 is extended forwardly and is bent to provide a substantially annular shaped heel or fulcrum member 14 and the terminal thereof is bent downwardly to provide a shank 15 at the point of connection of the annular heel or fulcrum member 14 with the leg 11. The shank is then extended forwardly in a straight line in substantial parallel relation to the heel or fulcrum 14 and is sharpened to provide a penetrating tongue 16. This tongue lies substantially at the diametric center of the heel or fulcrum 14.

The terminal of the leg 10 is now coiled about the point of connection of the shank 15 with the leg 11 and heel or fulcrum 14 as at 17 which provides an effective means for joining these parts together. The coil 17, not only provides means for joining these parts together but also acts as a reinforcing member at the point of greatest strain.

In use of the improved cap remover, the same is held at an angle to the horizontal and the prong is forced through the cap C at the desired point until the forward end of the heel or fulcrum 14 comes into engagement with the upper surface of the cap. The handle is now swung upwardly which will swing the cap from its seat at one side thereof, after which the lifting action can be continued for pulling the entire cap from its seat.

It is obvious from the foregoing that a device of exceptionally simple and durable construction has been provided which can be readily inserted into a cap for permitting the quick and convenient removing of the cap from the bottle seat.

Changes in details may be made without departing from the spirit or the scope of the invention, but:—

What I claim as new is:

A milk bottle cap remover formed from a single length of wire comprising a pair of legs and a connecting bight portion forming a manipulating handle, the legs being crossed at their forward ends to reinforce one another, a forwardly projecting substantially annular fulcrum heel formed on the forward end of one of said legs, a depending shank formed on the end of the fulcrum heel arranged in engagement with the legs and fulcrum at the point of connection thereof, a forwardly projecting penetrating prong formed on the lower end of the shank arranged in a substantially parallel relation to the fulcrum heel in a plane below the same and extending diametrically across the fulcrum heel, and an extension formed on the other leg coiled about the shank at the point of connection of the first leg with the fulcrum heel and extending from the prong to the fulcrum heel to reinforce the same.

In testimony whereof I affix my signature.

JOHN M. MOTT.